US012585476B2

(12) United States Patent
Wang et al.

(10) Patent No.: US 12,585,476 B2
(45) Date of Patent: Mar. 24, 2026

(54) MULTI-DIMENSIONAL AUTO SCALING OF CONTAINER-BASED CLUSTERS

(71) Applicant: VMware LLC, Palo Alto, CA (US)

(72) Inventors: Dongni Wang, San Jose, CA (US); Aiswaryaa Venugopalan, San Jose, CA (US); Arnav Chakravarthy, San Francisco, CA (US); Marius Vilcu, Arlington, MA (US); Asmitha Rathis, Santa Clara, CA (US); Greg Burk, Colorado Springs, CO (US)

(73) Assignee: VMware LLC, Palo Alto, CA (US)

( * ) Notice: Subject to any disclaimer, the term of this patent is extended or adjusted under 35 U.S.C. 154(b) by 321 days.

(21) Appl. No.: 18/210,032

(22) Filed: Jun. 14, 2023

(65) Prior Publication Data

US 2024/0419457 A1     Dec. 19, 2024

(51) Int. Cl.
  *G06F 9/445*       (2018.01)
  *G06F 9/50*        (2006.01)
(52) U.S. Cl.
  CPC .......... *G06F 9/44505* (2013.01); *G06F 9/505* (2013.01)
(58) Field of Classification Search
  None
  See application file for complete search history.

(56) References Cited

U.S. PATENT DOCUMENTS 9,928,097 B1 *   3/2018   Krottapalli ............... G06F 8/65
2020/0218990 A1   7/2020   Li et al.
(Continued)

FOREIGN PATENT DOCUMENTS

WO   WO-2021-220092 A1   11/2021

OTHER PUBLICATIONS

"VMware Tanzu Kubernetes Grid Documentation," Web page, 4 pages, retrieved from <https://docs.vmware.com/en/VMware-Tanzu-Kubernetes-Grid/index.html> on Jun. 15, 2023.
(Continued)

*Primary Examiner* — Paul Yen
(74) *Attorney, Agent, or Firm* — King Intellectual Asset Mangement

(57)          ABSTRACT
The disclosure provides a method for determining a target configuration for a container-based cluster. The method generally includes determining, by a virtualization management platform configured to manage components of the cluster, a current state of the cluster, determining, by the virtualization management platform, at least one of performance metrics or resource utilization metrics for the cluster based on the current state of the cluster, processing, with a model configured to generate candidate configurations recommended for the cluster, the current state and at least one of the performance metrics or the resource utilization metrics and thereby generate the candidate configurations, calculating a reward score for each of the candidate configurations, selecting the target configuration as a candidate configuration from the candidate configurations based on the reward score of the target configuration, and adjusting configuration settings for the cluster based on the target configuration to alter the current state of the cluster.

20 Claims, 5 Drawing Sheets

(56) References Cited

U.S. PATENT DOCUMENTS

| | | |
|---|---|---|
| 2022/0156129 A1 | 5/2022 | Li et al. |
| 2022/0318060 A1 | 10/2022 | Choochotkaew et al. |

OTHER PUBLICATIONS

"Amazon Elastic Kubernetes Service Documentation," Web page, 1 page, retrieved from <https://docs.aws.amazon.com/eks/index.html> on Jun. 15, 2023.
"Kubernetes Autoscaler," Web page, 2 pages, retrieved from <https://github.com/kubernetes/autoscaler> on Jun. 15, 2023.
"Configure multidimensional Pod autoscaling," Web page, 8 pages, retrieved from <https://cloud.google.com/kubernetes-engine/docs/how-to/multidimensional-pod-autoscaling> on Jun. 15, 2023.
"Kubecost." Web page, 3 pages, retrieved from <https://www.kubecost.com/> on Jun. 15, 2023.
"What is container optimization?," Web page, 2 pages, retrieved from <https://www.densify.com/resources/container-optimization/> on Jun. 15, 2023.
"Part 1: Key Concepts in RL," Web page, 9 pages, retrieved from <https://spinningup.openai.com/en/latest/spinningup/rl_intro.html> on Jun. 15, 2023.
"Kubernetes Observability The Future of Kubernetes Monitoring." Web page, 6 pages, retrieved from <https://tanzu.vmware.com/content/vmware-aria-operations-for-applications-solutions/kubernetes-monitoring-and-observability> on Jun. 15, 2023.
Extended European Search Report, European Application No. 24181861.6 dated Nov. 11, 2024, 14 pages.
Wang, Ferlin, Chiesa: "Predicting CPU usage for proactive autoscaling", Proceedings of the 1st Workshop on Machine Learning and Systems, Apr. 26, 2021, pp. 31-38, XP058566070, 8 pages.
Nguyen, Kim: "Toward Highly Scalable Load Balancing in Kubernetes Clusters", IEEE Communications Magazine, vol. 58, No. 7, Jul. 1, 2020, pp. 78-83, XP011802034, [retrieved on Aug. 6, 2020], 6 pages.
Jang, Lao: "Enhancing Node Fault Tolerance through High-Availability Clusters in Kubernetes", IEEE 3rd International Conference on Electronic Communications, Internet of Things and Big Data (ICEIB), Apr. 14, 2023, pp. 30-35, XP034373203, [retrieved on Jul. 7, 2023], 6 pages.

* cited by examiner

300

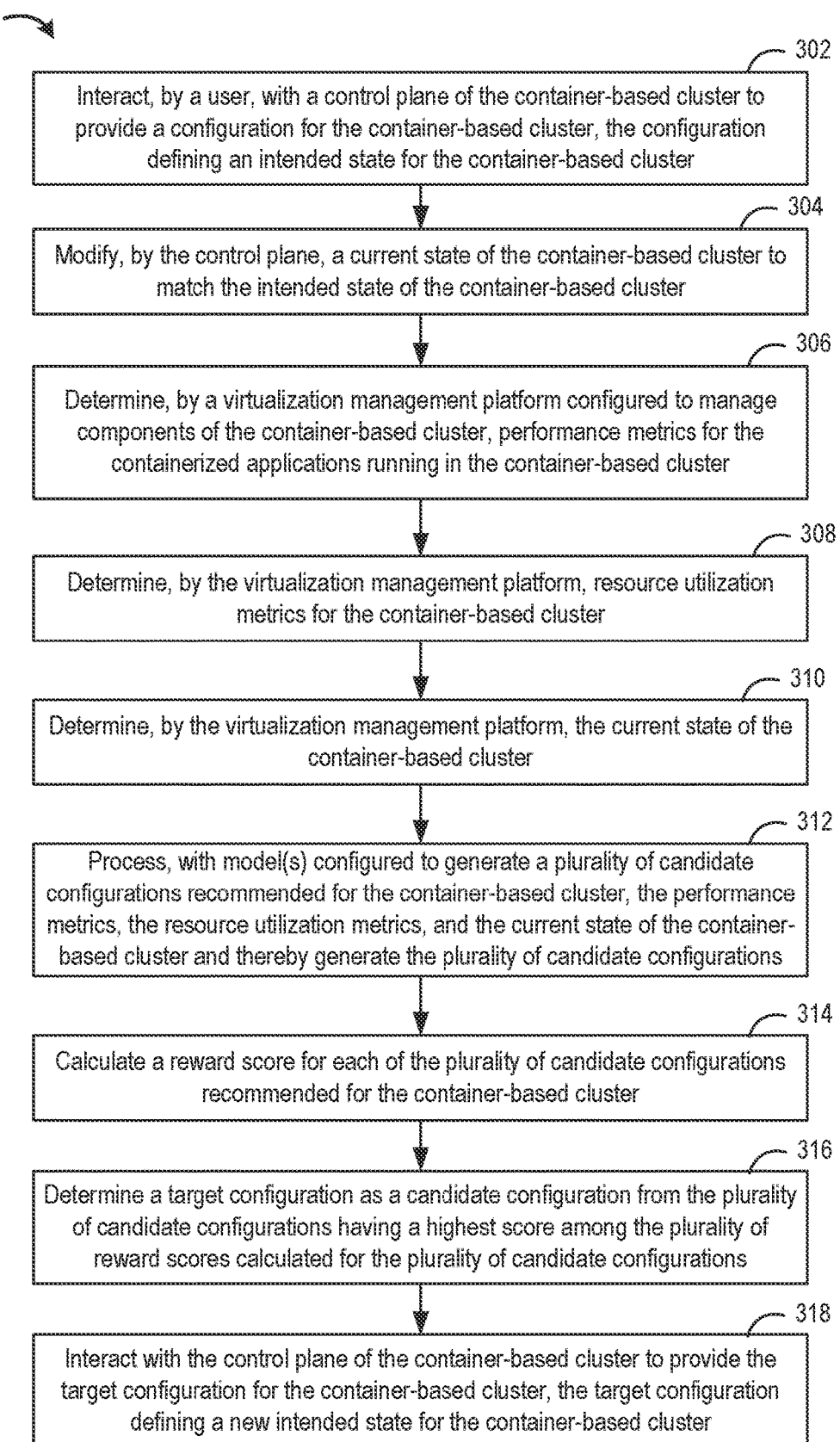

302

Interact, by a user, with a control plane of the container-based cluster to provide a configuration for the container-based cluster, the configuration defining an intended state for the container-based cluster

304

Modify, by the control plane, a current state of the container-based cluster to match the intended state of the container-based cluster

306

Determine, by a virtualization management platform configured to manage components of the container-based cluster, performance metrics for the containerized applications running in the container-based cluster

308

Determine, by the virtualization management platform, resource utilization metrics for the container-based cluster

310

Determine, by the virtualization management platform, the current state of the container-based cluster

312

Process, with model(s) configured to generate a plurality of candidate configurations recommended for the container-based cluster, the performance metrics, the resource utilization metrics, and the current state of the container-based cluster and thereby generate the plurality of candidate configurations

314

Calculate a reward score for each of the plurality of candidate configurations recommended for the container-based cluster

316

Determine a target configuration as a candidate configuration from the plurality of candidate configurations having a highest score among the plurality of reward scores calculated for the plurality of candidate configurations

318

Interact with the control plane of the container-based cluster to provide the target configuration for the container-based cluster, the target configuration defining a new intended state for the container-based cluster

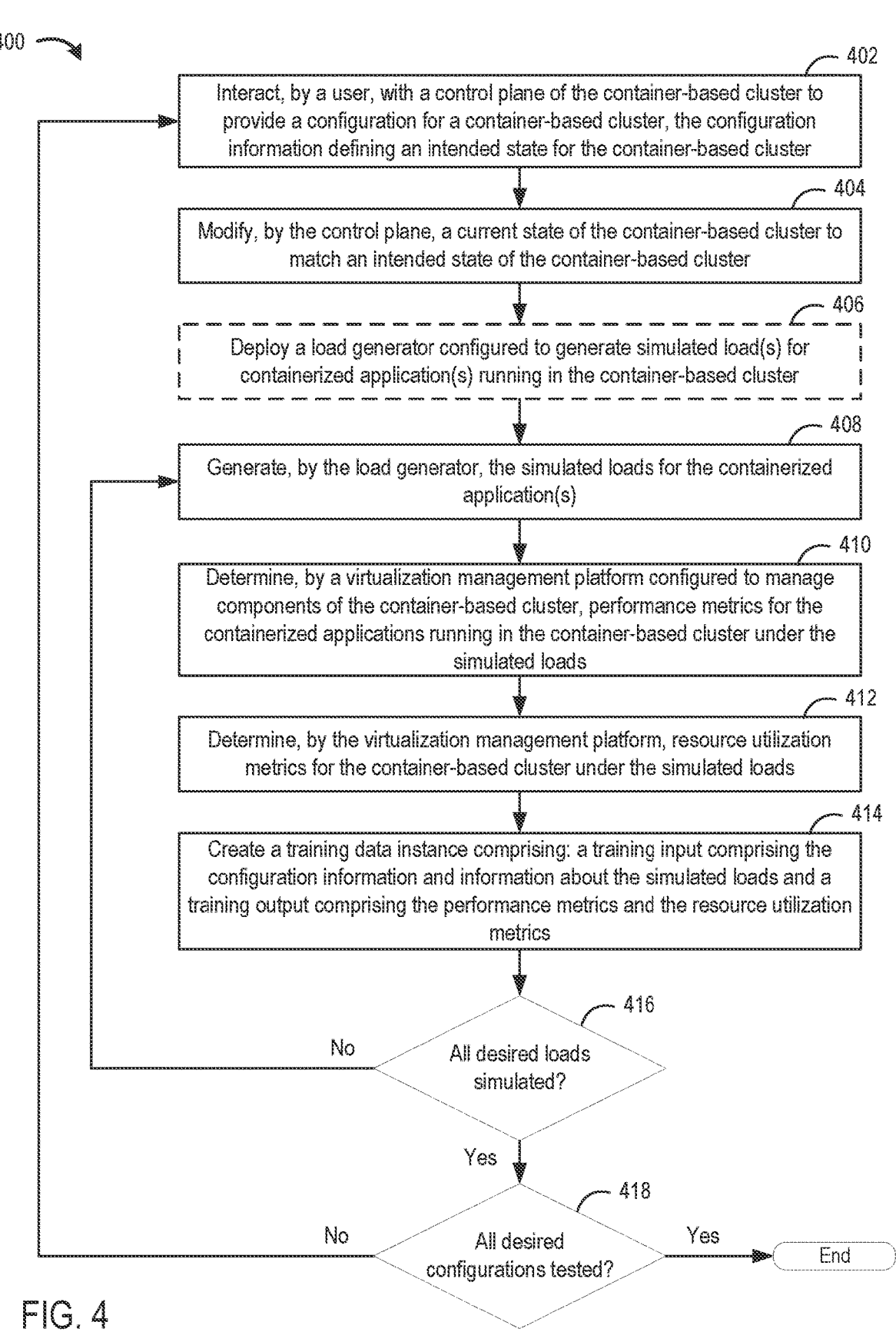

402

Interact, by a user, with a control plane of the container-based cluster to provide a configuration for a container-based cluster, the configuration information defining an intended state for the container-based cluster

404

Modify, by the control plane, a current state of the container-based cluster to match an intended state of the container-based cluster

406

Deploy a load generator configured to generate simulated load(s) for containerized application(s) running in the container-based cluster

408

Generate, by the load generator, the simulated loads for the containerized application(s)

410

Determine, by a virtualization management platform configured to manage components of the container-based cluster, performance metrics for the containerized applications running in the container-based cluster under the simulated loads

412

Determine, by the virtualization management platform, resource utilization metrics for the container-based cluster under the simulated loads

414

Create a training data instance comprising: a training input comprising the configuration information and information about the simulated loads and a training output comprising the performance metrics and the resource utilization metrics

416

All desired loads simulated?

No

Yes

418

All desired configurations tested?

No

Yes

End

FIG. 4

MULTI-DIMENSIONAL AUTO SCALING OF CONTAINER-BASED CLUSTERS

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that may have pooled resources allocated in a cloud-like manner. Hybrid cloud refers specifically to a combination of public cloud and private clouds. Thus, an application deployed across a hybrid cloud environment consumes both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that depend on a shared operating system (OS) kernel. Containerized applications (also referred to as "containerized workloads"), can include a collection of one or more related applications packaged into one or more containers. In some orchestration systems, a set of one or more related containers sharing storage and network resources, referred to as a pod, are deployed as a unit of computing software. Container orchestration systems automate the lifecycle of containers, including such operations as provisioning, deployment, monitoring, scaling (up and/or down), networking, and load balancing.

Kubernetes® (K8S®) software is an example open-source container orchestration platform that automates the deployment and operation of such containerized applications. At a high level, the Kubernetes platform is made up of a central database containing Kubernetes objects, or persistent entities, that are managed in the platform. Kubernetes objects are represented in configuration files, such as JavaScript Object Notation (JSON) or YAML files, and describe the intended state of a Kubernetes cluster of interconnected nodes used to run containerized applications. A node may be a physical machine, or a VM configured to run on a physical machine running a hypervisor. The intended state of the cluster includes intended infrastructure (e.g., pods, containers, etc.) and containerized applications that are to be deployed in the cluster. In other words, a Kubernetes object is a "record of intent"-once an object is created, the Kubernetes system will constantly work to ensure that object is realized in the deployment.

There are two categories of objects in Kubernetes: native Kubernetes objects and custom resource definition (CRD) objects (also referred to herein as "custom resources"). Native Kubernetes objects include pods, services, volumes, namespaces, deployments, replication controllers, ReplicaSets, and/or the like which are supported and can be created/manipulated by a Kubernetes application programming interface (API). The Kubernetes API is a resource-based (e.g., RESTful or representational state transfer architectural style) programmatic interface provided via HTTP. A CRD object, on the other hand, is an object that extends the Kubernetes API or allows a user to introduce their own API into a Kubernetes cluster.

Kubernetes is designed to accommodate any number and/or type of configurations, as long as certain limitations are not exceeded (e.g., no more than a first threshold number of pods per node, no more than a second threshold total number of pods, no more than a third threshold total number of nodes, etc.). Deriving the "best" configuration for deploying containerized applications, however, is a technically challenging problem. In particular, a "best" configuration is a configuration that balances cost, resource consumption, and application performance/availability, while keeping the platform operations simple. Understanding a number of pods, a number of nodes, node size and capacity, a number of ReplicaSets (e.g., number of pod replicas), pod resource requirements, pod resource limitations, etc. to implement in the container-based cluster such that these variables are optimized may not be obvious or easily determined. In fact, determining the "best" configuration generally requires a trial-and-error process resulting in (1) many terminated/restarted pods in cases of under-allocation and (2) wasted resources in cases of over-allocation. Further, such configurations may need to be constantly updated as application requests change over time.

Some conventional approaches to determining the "best" configuration for a container-based cluster have been more empirical in nature. For example, a conventional approach is to rely on a human expert's knowledge in identifying the cluster configuration for deployment. Experts may need to have knowledge of workload patterns, application implementations, as well as an understanding of the infrastructure requirements and limitations when deriving the configuration. As this is an inherently subjective method, it is not repeatable or scalable. Accordingly, conventional manual methods for determining cluster configurations that seek to optimize cost, resource consumption, application performance, and operation complexity may not be effective.

Further, to account for changes in the number of applications deployed and/or resource requests by different applications over time, conventional approaches have developed several tools, including a horizontal pod autoscaler (HPA), a vertical pod autoscaler (VPA), and a cluster autoscaler (CA). These autoscalers are designed to help guarantee availability in Kubernetes by providing automatic scalability of application resources to adapt to varying load.

The HPA is a tool designed to automatically update workload resources, such as Deployments and ReplicaSets (e.g., designed to manage the deployment and scaling of a set of pods), scaling them to match the demand for applications in a container-based cluster. Horizontal scaling refers to the process of deploying additional pods in the cluster in response to increased load and/or removing pods in the container-based cluster in response to decreased load. In some cases, the HPA is designed to automatically increase and/or decrease the number of pod replicas in the cluster based on actual usage metrics, such as central processing unit (CPU) and/or memory utilization. In certain embodiments, the HPA is implemented as a control loop to scale pod replicas based on the ratio between desired metric values and current metric values. The choice of desired usage metric values imposes a tradeoff between application availability and operation costs.

The VPA is a tool designed to automatically adjust resource limits and/or resource requests (e.g., with respect to CPU and/or memory) to help ensure that pods are operating efficiently at all times. The VPA determines the adjustment by analyzing historic memory and/or CPU usage, as well as current memory and/or CPU usage, by containers running in pods. In certain embodiments, the VPA provides recommended values for resource requests and/or limits that a user can use to manually update the configuration. In certain embodiments, the VPA automatically updates the configuration based on these recommended values.

The CA is a standalone program that scales up or down a number of nodes in container-based cluster to help ensure that there are enough nodes to run all requested pods, and to remove excess nodes from the cluster. For example, the CA is designed to add nodes to the cluster when there are pending pods that cannot be scheduled on any of the existing nodes due to insufficient resources among the existing nodes. Additionally, the CA is designed to reduce a number of nodes in the cluster when at least one node is consistently not needed, and when pods running thereon are capable of being transferred to a different node for execution. As such, the CA is designed to act in a reactive manner by adding and/or removing nodes based on new pods added and/or removed. In some cases, this causes new pods added to the cluster to be in a pending state until an additional node is provisioned, thereby affecting application performance. In some CA implementations, paused pods are deployed to ameliorate this issue by reserving space to trick the CA into adding extra nodes prematurely. This, however, introduces additional operational complexity and cost into the system.

In other words, the above-described autoscalers automate the process of scaling applications to adapt to workload changes. However, the autoscalers themselves need to be configured and tuned over time, thereby introducing non-trivial setup and maintenance overhead. Moreover, these autoscaler tools may not work well together (if at all), and, as such, may add to the complexity of setup, tuning, and maintenance of these autoscalers when deployed. For example, currently, the HPA and VPA are not designed to be used simultaneously on the same resource, given they both attempt to optimize the resource in different ways.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for determining a target configuration for a container-based cluster. The method generally includes determining, by a virtualization management platform configured to manage components of the container-based cluster, a current state of the container-based cluster. The method generally includes determining, by the virtualization management platform, at least one of performance metrics or resource utilization metrics for the container-based cluster based on the current state of the container-based cluster. The method generally includes processing, with a model configured to generate a plurality of candidate configurations recommended for the container-based cluster, the current state and at least one of the performance metrics or the resource utilization metrics and thereby generate the plurality of candidate configurations. The method generally includes calculating a reward score for each of the plurality of candidate configurations. The method generally includes selecting the target configuration as a candidate configuration from the plurality of candidate configurations based on the reward score of the target configuration. The method generally includes adjusting configuration settings for the container-based cluster based on the target configuration to alter the current state of the container-based cluster.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 3 illustrates an example method for determining a target configuration for a container-based cluster, according to an example embodiment of the present disclosure.

FIG. 4 illustrates an example workflow for creating a plurality of training data instances for training a model to generate candidate configurations for a container-based cluster, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
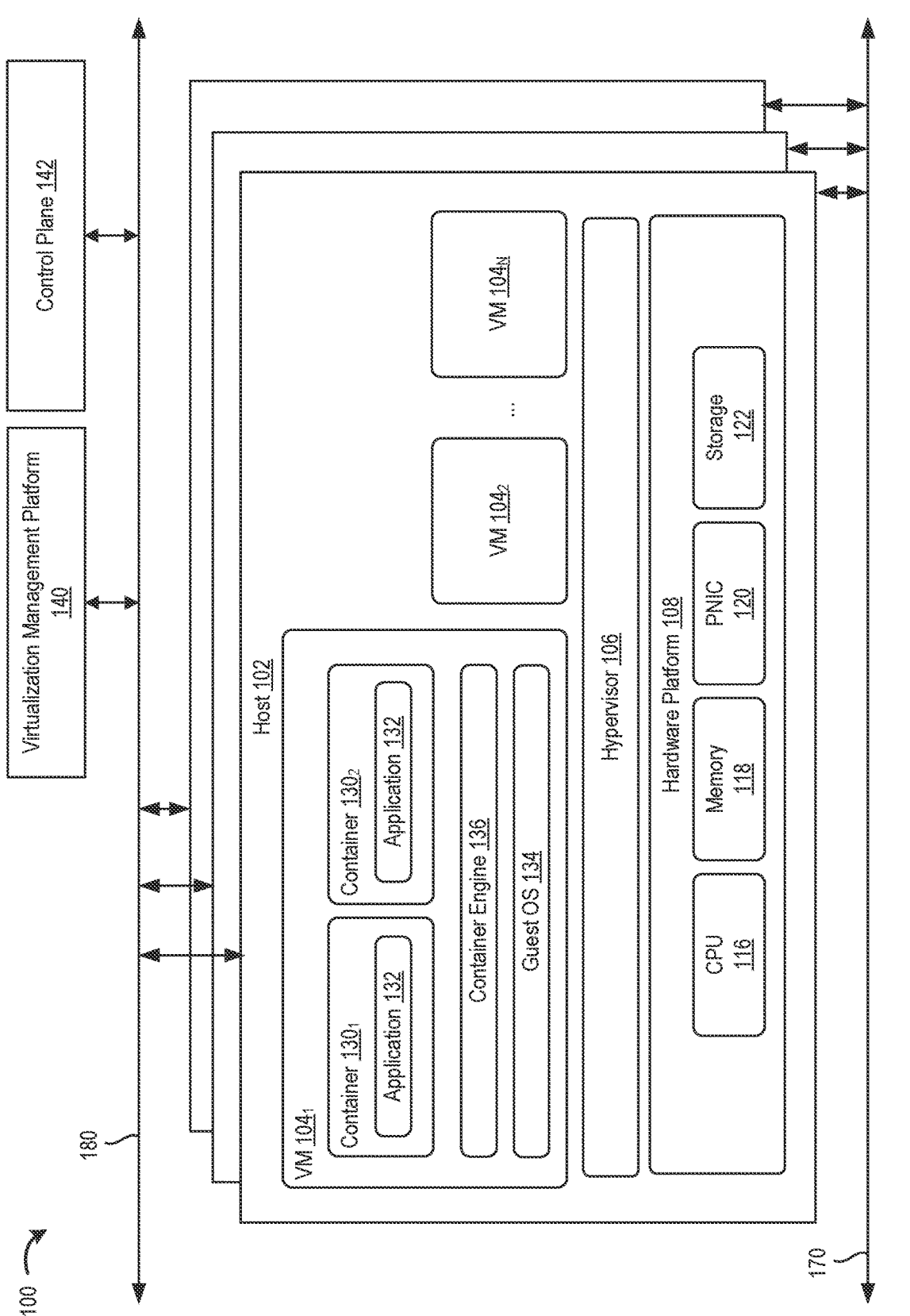
FIG. 1A illustrates a computing system in which embodiments described herein may be implemented.

Techniques for performing multi-dimensional auto scaling in container-based clusters are described herein. Multi-dimensional auto-scaling involves dynamically scaling pods (e.g., a number of pods and/or resources allocated to the pods) and/or nodes (e.g., number of nodes) up and/or down based on workload changes in a container-based cluster.

In particular, embodiments described herein utilize machine learning model(s) to generate and evaluate different candidate configurations for a container-based cluster for purposes of determining a target configuration for the cluster that provides improved workload performance and availability, while also limiting cost, resource consumption, and overall complexity over other candidate configurations. In certain embodiments, the identified target configuration is recommend to a user to prompt the user to manually update the configuration for the cluster. In certain other embodiments, the identified target configuration is used to automatically adjust configuration settings for the cluster. Adjusting configuration settings for the cluster using the target configuration includes, at least, scaling a number of pods, an amount of resources allocated to the pods, and/or a number of nodes in the cluster up and/or down.

The candidate configurations described herein contain values for various configuration settings, including at least, values specifying a number of pods, resource requests and/or limits assigned to each of the pods, and a number of nodes to deploy in the cluster. Each of the candidate configurations are generated by the machine learning model(s) based on a current state, resource utilization metrics, and/or performance metrics collected for the cluster. The machine learning model(s) are then configured to predict future application performance and resource utilization for each of the candidate configurations. A target configuration is selected among the candidate configurations based on the model predictions and, in some cases, an optimization objective identified by a user. The optimization objective may specify what factors are to be given priority over others when selecting the target configuration. For example, an optimization objective may specify to select a candidate configuration that prioritizes application performance and availability over cost optimization.

Further, certain embodiments described herein provide a method for training machine learning model(s) to generate and evaluate the different candidate configurations such that a target configuration for the cluster can be determined. The method includes obtaining a plurality of training data instances, and using the training data instances to train the model(s). The training data instances are obtained by collecting performance metrics and resource utilization metrics for different configurations and simulated loads applied to the cluster. As such, each training data instance used to train the machine learning model(s) includes (1) a training input comprising configuration information and information about a simulated load applied to the cluster and (2) a training output comprising performance metrics and resource utilization metrics collected for the corresponding configuration and load.

The techniques described herein for performing multidimensional auto scaling in container-based clusters using machine learning model(s) provide significant technical advantages over conventional solutions, such as improved configuration optimization with respect to multiple facets of the cluster. Further, the use of machine learning model(s) in determining a cluster's target configuration helps improve the efficiency of determining a configuration (e.g., "best" configuration) for a cluster, as well as application performance when the target configuration is deployed for the cluster. For example, the target configuration applied to the cluster may define resource requests and/or limits for application running in the cluster such that the application is neither under-provisioned or over-provisioned, which often results in poor application performance due to a lack of available resources or negative impacts to cluster capacity and overall cost, respectively.

FIG. 1A is a block diagram that illustrates a computing system 100 in which embodiments described herein may be implemented. Computing system 100 includes one or more hosts 102, a management network 180, a data network 170, and a virtualization management platform 140.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs 104₁ to 104N (collectively referred to as VMs 104 and individually referred to as VM 104) that run concurrently on the same host 102.

Host(s) 102 may be constructed on a server grade hardware platform 108, such as an x86 architecture platform. Hardware platform 108 of each host 102 includes components of a computing device such as one or more processors (central processing units (CPUs)) 116, memory (random access memory (RAM)) 118, one or more network interfaces (e.g., physical network interfaces (PNICs) 120), storage 122, and other components (not shown). CPU 116 is configured to execute instructions that may be stored in memory 118, and optionally in storage 122. The network interface(s) enable hosts 102 to communicate with other devices via a physical network, such as management network 180 and data network 170.

In certain embodiments, hypervisor 106 runs in conjunction with an operating system (OS) (not shown) in host 102. In some embodiments, hypervisor 106 can be installed as system level software directly on hardware platform 108 of host 102 (often referred to as "bare metal" installation) and be conceptually interposed between the physical hardware and the guest OSs executing in the VMs 104. It is noted that the term "operating system," as used herein, may refer to a hypervisor. One example of hypervisor 106 that may be configured and used in embodiments described herein is a VMware ESXi™ hypervisor provided as part of the VMware vSphere® solution made commercially available by VMware, Inc. of Palo Alto, CA.

Each of VMs 104 implements a virtual hardware platform that supports the installation of a guest OS 134 which is capable of executing one or more applications 132. Guest OS 134 may be a standard, commodity operating system. Examples of a guest OS include Microsoft Windows, Linux, and/or the like. Applications 132 may be any software program, such as a word processing program.

In certain embodiments, computing system 100 includes a container orchestrator. The container orchestrator implements a container orchestration control plane (also referred to herein as the "control plane 142"), such as a Kubernetes control plane, to deploy and manage applications 132 and/or services thereof on hosts 102 using containers 130. In particular, each VM 104 includes a container engine 136 installed therein and running as a guest application under control of guest OS 134. Container engine 136 is a process that enables the deployment and management of virtual instances, referred to herein as "containers," in conjunction with OS-level virtualization on guest OS 134 within VM 104 and the container orchestrator. Containers 130 provide isolation for user-space processes executing within them. Containers 130 encapsulate an application (and its associated applications 132) as a single executable package of software that bundles application code together with all of the related configuration files, libraries, and dependencies required for it to run.

Control plane 142 runs on a cluster of hosts 102 and may deploy containerized applications 132 as containers 130 on the cluster of hosts 102. Control plane 142 manages the computation, storage, and memory resources to run containers 130 in the host cluster. In certain embodiments, hypervisor 106 is integrated with control plane 142 to provide a "supervisor cluster" (i.e., management cluster) that uses VMs 104 to implement both control plane nodes and compute objects managed by the Kubernetes control plane.

In certain embodiments, control plane 142 deploys and manages applications as pods of containers 130 running on hosts 102, either within VMs 104 or directly on an OS of hosts 102. A pod is a group of one or more containers 130 and a specification for how to run the containers 130. A pod may be the smallest deployable unit of computing that can be created and managed by control plane 142.

Figure 1B:
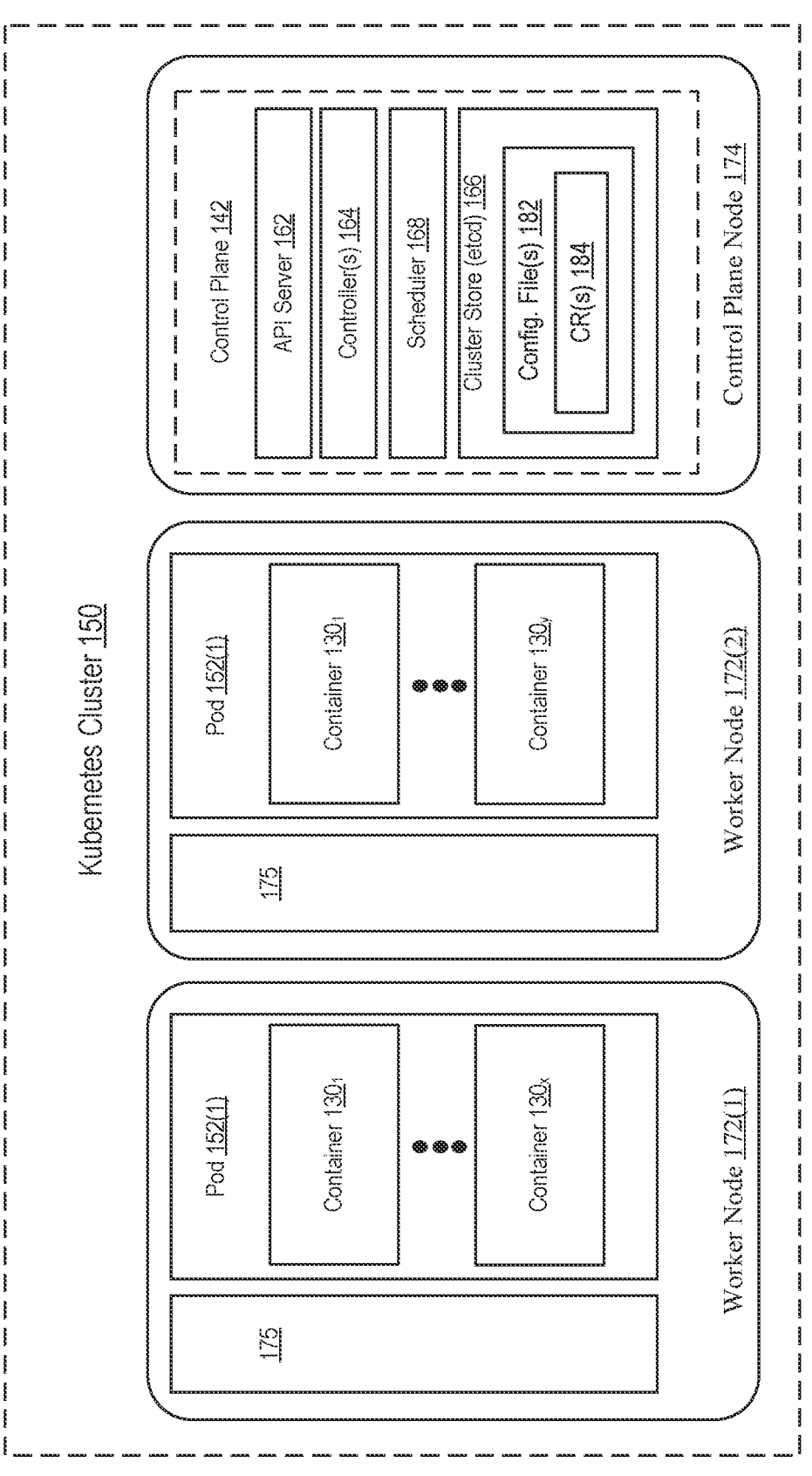
FIG. 1B illustrates an example container-based cluster for running containerized applications in the computing system of FIG. 1A, according to an example embodiment of the present disclosure.

An example container-based cluster for running containerized applications is illustrated in FIG. 1B. While the example container-based cluster shown in FIG. 1B is a Kubernetes cluster 150, in other examples, the container-based cluster may be another type of container-based cluster based on container technology, such as Docker Swarm clusters. As illustrated in FIG. 1B, Kubernetes cluster 150 is formed from a cluster of interconnected nodes, including (1)

one or more worker nodes 172 that run one or more pods 152 having containers 130 and (2) one or more control plane nodes 174 having control plane components running thereon that control the cluster (e.g., where a node is a physical machine, such as a host 102, or a VM 104 configured to run on a host 102).

Each worker node 172 includes a kubelet 175. Kubelet 175 is an agent that helps to ensure that one or more pods 152 run on each worker node 172 according to a defined state for the pods 152, such as defined in a configuration file. Each pod 152 may include one or more containers 130. The worker nodes 172 can be used to execute various applications 132 and software processes using containers 130. Further, each worker node 172 may include a kube proxy (not illustrated in FIG. 1B). A kube proxy is a network proxy used to maintain network rules. These network rules allow for network communication with pods 152 from network sessions inside and/or outside of Kubernetes cluster 150.

Control plane 142 (e.g., running on one or more control plane nodes 174) includes components such as an application programming interface (API) server 162, controller(s) 164, a cluster store (etcd) 166, and scheduler(s) 168. Control plane 142's components make global decisions about Kubernetes cluster 150 (e.g., scheduling), as well as detect and respond to cluster events.

API server 162 operates as a gateway to Kubernetes cluster 150. As such, a command line interface, web user interface, users, and/or services communicate with Kubernetes cluster 150 through API server 162. One example of a Kubernetes API server 162 is kube-apiserver. The kube-apiserver is designed to scale horizontally—that is, this component scales by deploying more instances. Several instances of kube-apiserver may be run, and traffic may be balanced between those instances.

Controller(s) 164 is responsible for running and managing controller processes in Kubernetes cluster 150. As described above, control plane 142 may have (e.g., four) control loops called controller processes, which watch the state of Kubernetes cluster 150 and try to modify the current state of Kubernetes cluster 150 to match an intended state of Kubernetes cluster 150.

Scheduler(s) 168 is configured to allocate new pods 152 to worker nodes 172.

Cluster store (etcd) 166 is a data store, such as a consistent and highly-available key value store, used as a backing store for Kubernetes cluster 150 data. In certain embodiments, cluster store (etcd) 166 stores configuration file(s) 182, such as JavaScript Object Notation (JSON) or YAML files, made up of one or more manifests that declare intended system infrastructure and workloads to be deployed in Kubernetes cluster 150. Kubernetes objects, or persistent entities, can be created, updated and deleted based on configuration file(s) 182 to represent the state of Kubernetes cluster 150.

A Kubernetes object is a "record of intent"—once an object is created, the Kubernetes system will constantly work to ensure that object is realized in the deployment. One type of Kubernetes object is a custom resource definition (CRD) object (also referred to herein as a "custom resource (CR) 184") that extends API server 162 or allows a user to introduce their own API into Kubernetes cluster 150. In particular, Kubernetes provides a standard extension mechanism, referred to as custom resource definitions, that enables extension of the set of resources and objects that can be managed in a Kubernetes cluster.

As described above, Kubernetes is designed to accommodate any number and/or type of configurations (e.g., identified in configuration file(s) 182), as long as certain limitations are not exceeded. To determine a target configuration for a cluster that provides improved workload performance and availability, while also limiting cost, resource consumption, and/or overall complexity, embodiments described herein utilize machine learning model(s). The one or more machine learning models are (1) trained to generate a plurality of candidate configurations for the cluster, (2) predict future application performance and resource utilization for each of the candidate configurations, and (3) select a target configuration among the candidate configurations based on the model predications and, in some cases, an optimization objective identified by a user. Using machine learning model(s) to determine a target configuration for a cluster is illustrated in FIGS. 2 and 3.

Figure 2:
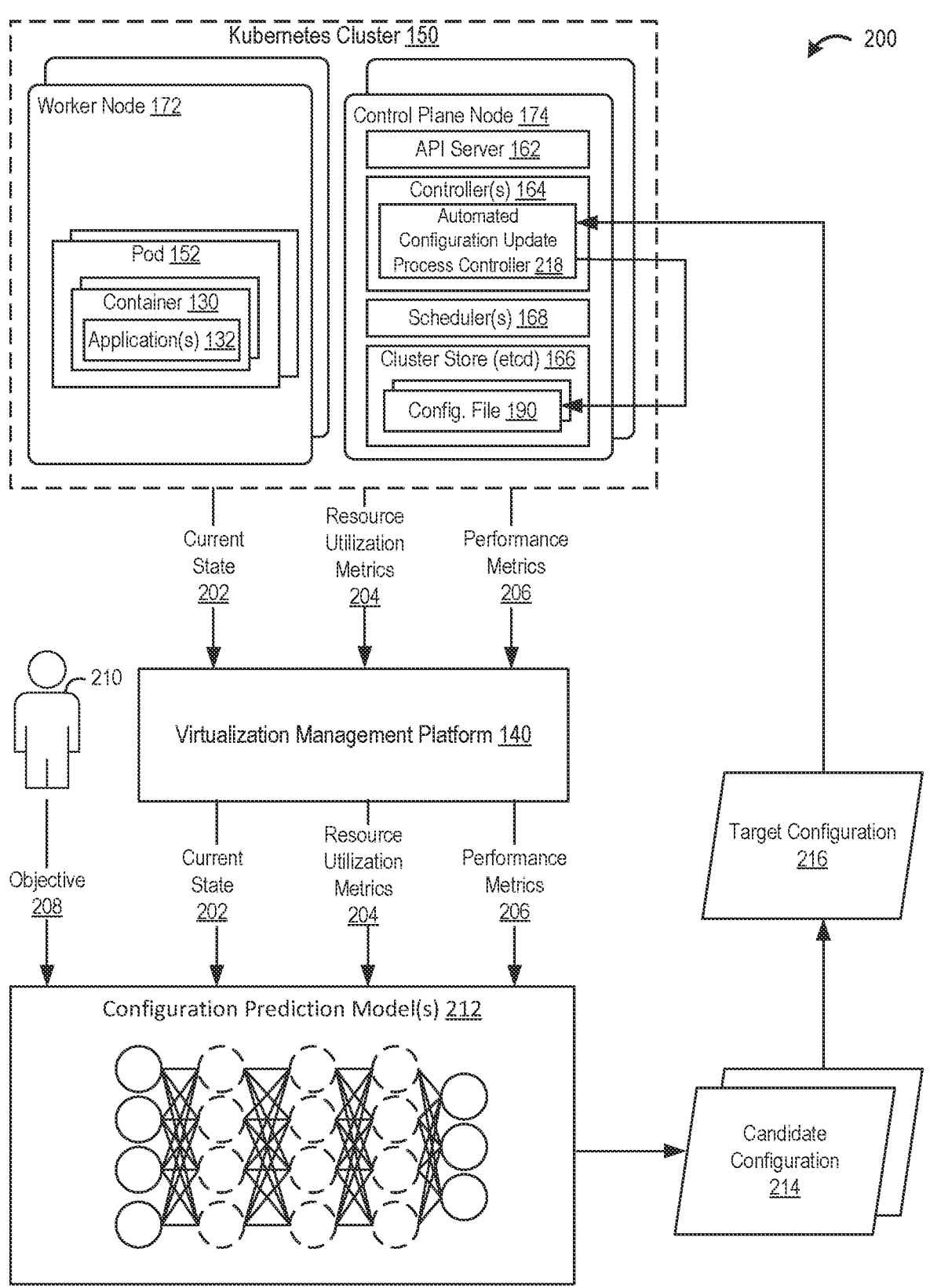
FIG. 2 illustrates an example system configured to perform multi-dimensional auto-scaling for a container-based cluster, according to an example embodiment of the present disclosure.

In particular, FIG. 2 illustrates an example system 200 configured to perform multi-dimensional auto-scaling for a container-based cluster, according to an example embodiment of the present disclosure. As illustrated, system 200 includes a Kubernetes cluster 150 (e.g., described in detail with respect to FIG. 1B), a virtualization management platform 140, and configuration prediction model(s) 212. In certain embodiments, Kubernetes cluster 150 includes an automated configuration update process controller 218. System 200 is configured to generate and evaluate candidate configurations 214 to determine a target configuration 216 for Kubernetes cluster 150. In this example, the determined target configuration 216 is provided to Kubernetes cluster 150 to define a new intended state for Kubernetes cluster 150. The new intended state defined for Kubernetes cluster 150 may help to improve performance and availability of containerized applications 132 running in cluster 150.

FIG. 3 illustrates an example method 300 for determining a target configuration for a container-based cluster, according to an example embodiment of the present disclosure. Method 300 may be performed by system 200 to determine target configuration 216 for Kubernetes cluster 150. As such, FIGS. 2 and 3 are described in conjunction below.

As illustrated in FIG. 3, method 300 begins, at operation 302, with a user interacting with a control plane of a container-based cluster to provide a configuration for the container-based cluster. The configuration defines an intended state for the cluster. For example, in FIG. 2, a user may interact with control plane node 174 to provide configuration file(s) 190. Configuration files 190, provided by the user, are made up of one or more manifests that declare intended system infrastructure and workloads to be deployed in Kubernetes cluster 150. Configuration file(s) 190 include initial configuration settings for cluster 150, specifying a number of pods, a number of nodes, node size and capacity, a number of ReplicaSets (e.g., number of pod replicas), pod resource requirements, pod resource limitations, etc. to implement in Kubernetes cluster 150. As described in detail below, the initial configuration defined by the user in configuration file(s) 190 may be adjusted based on a target configuration 216 determined for cluster 150 by configuration prediction model(s) 212.

Method 300 proceeds, at operation 304, with the control plane modifying a current state of the container-based cluster to match the intended state of the cluster. As such, in FIG. 2, controller(s) 164 in control plane node 174 work to modify the current state of Kubernetes cluster 150 to match the intended state of Kubernetes cluster 150 specified in configuration file(s) 190. In certain embodiments, modifying the current state of Kubernetes cluster 150 to match the intended state includes deploying application(s) 132 in container(s) 130 on worker node(s) 172.

Method 300 proceeds, at operation 306, with a virtualization management platform (e.g., configured to manage components of the container-based cluster) determining performance metrics for the containerized application(s) deployed and running in the container-based cluster. Further, at operations 308 and 310, the virtualization management platform additionally collects resource utilization metrics for the container-based cluster and information about the current state of the container-based cluster, respectively.

For example, in FIG. 2, at operations 306, 308, and 310, virtualization management platform 140 collects performance metrics 206, resource utilization metrics 204, and information about a current state 202 of Kubernetes cluster 150.

Performance metrics 206 may include performance information collected for each application 132 running in Kubernetes cluster 150. The performance information may provide insight into CPU usage of each application 132 (e.g., compared to a CPU limit assigned to the corresponding application 132 or a pod 152 running the corresponding application 132) and/or memory usage of the each application 132 (e.g., compared to a memory limit assigned to the corresponding application 132 or a pod 152 running the corresponding application 132). The performance information may also include details about application availability (e.g., service uptime), latency, average response time (e.g., read and/or write), input/output (I/O) rate, user satisfaction, request error rates, and/or the like for each application 132 running in Kubernetes cluster 150.

Resource utilization metrics 204 may include information about total CPU utilization and/or total memory utilization. Total CPU utilization is the average utilization percentage of the CPU allocated to a particular component (e.g., pod 152, worker node 172, etc.) in Kubernetes cluster 150, over an interval. Total memory utilization is the average utilization percentage of the memory allocated to a particular component in Kubernetes cluster 150 over an interval. Resource utilization metrics 204 may provide insight into whether or not resources were adequate, under-provisioned, and/or over-provisioned for different components in Kubernetes cluster 150.

As described above, current state 202 for Kubernetes cluster 150 may match the intended state declared for the cluster in configuration files 190. Current state 202 determined by virtualization management platform 140 may include information about a number of pods deployed, a number of nodes deployed, resources allocated to different components, and/or other information about infrastructure and/or applications 132 deployed in Kubernetes cluster 150.

Method 300 proceeds, at operation 312, with processing, via a model(s) configured to generate a plurality of candidate configurations recommended for the container-based cluster (e.g., configuration prediction model(s) 212), the performance metrics, the resource utilization metrics, and the current state of the container-based cluster. The model(s) used to process these inputs may generate the plurality of candidate configurations for the cluster.

In certain embodiments, the model(s) is a digital twin model. The digital twin model establishes a virtual model of the container-based cluster based on the real-time current state, resource utilization metrics, and performance metrics collected for the cluster being modeled. Once the virtual model is informed with such data, the virtual model is used to run simulations, study performance issues, and/or generate possible improvements with respect to configuration settings (e.g., generate candidate configurations) for the cluster. In other words, the virtual representation created for the cluster is used to simulate behaviors of the cluster and predict application and cluster performance.

In certain embodiments, the digital twin model designed to generate candidate configurations recommended for the container-based cluster, is a neural-network based digital twin model. Neural networks generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. The layers may include an input layer, one or more hidden layers, and an output layer.

A model training component (not illustrated in FIG. 2) is generally configured to train the model(s) to generate recommended candidate configurations for different clusters. In certain embodiments, the model training component trains the model(s) using training data comprising a plurality of training data instances generated for the cluster being analyzed via use of a load generator (not illustrated in FIG. 2), as described in detail below with respect to FIG. 4.

As such, at operation 312 in FIG. 2, virtualization management platform 140 provides current state 202, resource utilization metrics 204, and performance metrics 206 as input into configuration prediction model(s) 212. Configuration prediction model(s) 212 may be deployed and run on any nodes (e.g., such as VMs), pod(s) 152, and/or container(s) 130 in Kubernetes cluster 150. Configuration prediction model(s) 212 uses this input information to generate a plurality of candidate configurations 214 for Kubernetes cluster 150.

In this example implementation, configuration prediction model(s) 212 is a neural-network based digital twin model(s). More specifically, configuration prediction model(s) 212 is a 3-layer neural network digital twin model with hidden layer sizes 64, 32, and 64.

Configuration prediction model(s) 212 is a model(s) trained offline (e.g., prior to deployment to predict candidate configurations 214 for Kubernetes cluster 150) using various training techniques. In certain embodiments, configuration prediction model(s) 212 is trained using mean squared error (MSE). Mean Squared Error is calculated as the average of all of the squared differences between the true values and the predicted values generated by configuration prediction model(s) 212. A smaller MSE indicates that the prediction made by the model(s) is more accurate.

Further, configuration prediction model(s) 212 is validated using one or more validation techniques. In certain embodiments, configuration prediction model(s) 212 is validated using cross validation techniques, and more specifically, a 10-fold cross-validation during model tuning and testing. Cross validation, such as k-fold cross validation (e.g., where k is a positive integer), describes a process of dividing a dataset into k folds or subsets, using (k−1) folds as training data to train the model(s), and validating the model(s) using the remaining fold. Cross validation techniques are used to test the ability of the model(s) to predict new data, identify problems, such as overfitting and/or selection bias, and/or give insight into how the model(s) will generalize to an independent dataset.

Candidate configurations 214 generated by configuration prediction model(s) may indicate different intended states for Kubernetes cluster 150. Candidate configurations 214 may include one or more similar configuration settings and/or one or more different configuration settings. For example, all candidate configurations 214 generated by Kubernetes cluster may specify that a number of pods to be deployed is equal to 100, while a number of nodes indicated to be deployed for running these 100 pods varies across the different candidate configurations 214.

Method 300 then proceeds, at operation 314, with calculating a reward score for each of the plurality of candidate configurations recommended for the container-based cluster. In certain embodiments, the model(s) are configured to calculate the reward score for each candidate configuration at operation 314. The reward score is a numeric value that identifies how good or bad a predicted candidate configuration is for the cluster.

In certain embodiments, the reward score calculated for each candidate configuration is computed from a parametric function with application metrics, memory and/or CPU usage and request, and node utilization. For example, the reward score may be calculated using the following equation:

$$R = \alpha \cdot R_{app} + \beta \cdot R_{usage} + \gamma \cdot R_{resource}$$

where, $$R_{app} = fa(S_{Request\ Error\ Rate}, S_{Response\ Time}, \mu_{Response\ Time})$$

and $S_{RequestErrorRate}$ is the request error rate, $S_{ResponseTime}$ is the request response time, and $\mu_{ResponseTime}$ is the mean request response time.

Further, $$R_{usage} = \sum_{i}^{deployment} fu\big(S_{Mem\ Usage_i}, S_{MemLimit_i}, S_{MemRequest_i}\big)$$

where $S_{MemUsage}$ is the memory usage, $S_{MemLimit}$ is the memory limit, and $S_{MemRequest}$ is the memory request. Although in this example, parameter $R_{usage}$ is calculated only based on memory usage, limits, and requests; other examples may calculate parameter $R_{usage}$ based on CPU usage, limits, and requests, in addition to, or alternative, to the memory usage, limits, and requests.

Further, $$R_{resource} = fr(S_{utilization}, t_{utilization})$$

where $S_{utilization}$ is the current node utilization and $t_{MemLimit}$ is the target node utilization.

Parameters $\alpha$, $\beta$, and $\gamma$ are weights set to define the priority of application availability and response with respect to resource consumption in the above equation. For example, in some cases, application availability and response is to be prioritized over resource consumption; thus, weight parameter $\alpha=0.8$ and weight parameters $\beta=\gamma=1$.

In certain embodiments, a user specifies what variables are to be given priority over other variables when calculating the reward score for each candidate configuration. In particular, a user may interact with the model(s) to specify an optimization objective. The model(s) may use this optimization objective when calculating the reward score for each candidate configuration. In some cases, the optimization objective may request that a candidate configuration 214 with better application performance and availability be given a higher reward score, and weight parameters $\alpha$, $\beta$, and $\gamma$ may be adjusted accordingly to carry out this objective. In some other cases, the optimization objective may request that a candidate configuration 214 with better resource utilization be given a higher reward score or a candidate configuration 214 with less complexity be given a higher reward score, and weight parameters $\alpha$, $\beta$, and $\gamma$ may be adjusted accordingly to carry out each of these objective.

In the example illustrated in FIG. 2, at operation 314, configuration prediction model(s) 212 calculate a reward score for each of candidate configurations 214 generated and recommended for Kubernetes cluster 150. Configuration prediction model(s) 212 is configured to calculate the reward score for each of candidate configurations 214 based on an objective 208 (e.g., an optimization objective) provided by user 210.

Method 300 then proceeds, at operation 316, with determining a target configuration as a candidate configuration from the plurality of candidate configurations having a highest score among the plurality of reward scores calculated for the plurality of candidate configurations. For example, in FIG. 2, a candidate configuration 214 having a highest calculated reward score is determined to be the target configuration 216 for Kubernetes cluster 150.

Method 300 then proceeds, at operation 318, with interacting with the control plane of the container-based cluster to provide the target configuration for the container-based cluster. In certain embodiments, the target configuration is provided to the user, and the user interacts with the control plane to provide the target configuration, or in other words, update configuration settings for the cluster defined in the configuration files to match the determined target configuration. In certain other embodiments, the system is configured to automatically update configuration settings for the cluster based on the determined target configuration. The target configuration defines a new intended state for the container-based cluster; thus, when the configuration settings are adjusted to match the intended cluster state defined in the target configuration, controller(s) of the control plane work to modify the current state of container-based cluster to match the new intended state of cluster.

For example, in FIG. 2, at operation 318, configuration settings for Kubernetes cluster 150, defined in configuration file(s) 190, are adjusted to match target configuration 216. In certain embodiments, automated configuration update process controller 218 is configured to make such adjustments (e.g., updates) to configuration file(s) 190 in Kubernetes cluster 150. Automated configuration process controller 218 may be a custom controller 164, deployed in Kubernetes cluster 150, that is responsible for automating configuration setting updates. For example, automated configuration update process controller 218 may monitor for new target configuration(s) 216 (e.g., determined from outputs of configuration prediction model(s) 212). When a new target configuration 216 is detected, automated configuration update process 218 may determine whether the new target configuration 216 differs from the existing configuration defined for Kubernetes cluster 150 in configuration file(s) 190. If target configuration 216 differs from the existing configuration, then automated configuration update process 218 may automatically update configuration settings in configuration file(s) 190 to match the target configuration 216. Although FIG. 2 illustrates automated configuration update process controller 218 performing the configuration setting update, in certain other embodiments, any other process deployed for Kubernetes cluster 150, may be configured to perform the update.

Controller(s) 164 then work to update infrastructure and/or workloads in Kubernetes cluster 150 based on the adjustment. For example, assuming Kubernetes cluster 150 previously had 50 pods 152 deployed, and the configuration settings were updated indicating that 75 pods 152 are instead intended for the cluster, controller(s) 164 work to realize the deployment of 25 additional pods 152 in Kubernetes cluster 150.

Method 300 may be continuously and/or periodically performed to adjust configuration settings of the container-based cluster to account for changes in the number of applications deployed and/or application resource needs. As such, configuration settings for the cluster may continue to be updated to help provide optimal application performance and availability, while also limiting cost, resource consumption, and overall complexity for the cluster.

As described above, model(s) used to generate candidate configurations and determine a target configuration for a container-based cluster (e.g., such as configuration prediction model(s) 212 in FIG. 2) are trained prior to deployment. The model(s) are trained based on training data generated and collected during a load simulation and/or for real-world loads applied to a cluster (e.g., load generated as the cluster functions naturally and is used by real-world users and/or other systems). In particular, during load simulation(s), various loads may be generated and simulated for different cluster configuration settings. Performance of the cluster may be observed for each of the different configuration settings and simulated loads. Performance of the cluster may also be observed for different configuration settings and real-world loads applied to the cluster. This information may then be used to create training data instances for training the model(s) to generate the candidate configurations.

For example, FIG. 4 illustrates an example workflow 400 for creating a plurality of training data instances generated and collected during load simulation(s), for training a model to generate candidate configurations for a container-based cluster, according to an example embodiment of the present disclosure. Each of the training data instances generated according to workflow 400 includes a training input and a training output (often referred to as a label). The training input includes configuration information and information about loads simulated for a cluster. The training output includes performance metrics and/or resource utilization metrics observed for the cluster when the cluster is configured based on the corresponding configuration information included in the training input and when the corresponding loads included in the training input are generated for the cluster.

Workflow 400 begins, at operation 402, with a user interacting with a control plane of a container-based cluster to provide a configuration for the container-based cluster. The configuration defines an intended state for the cluster. For example, a user may interact with the control plane node to provide configuration settings intended for the cluster in one or more configuration file(s). At operation 404, controller(s) in the cluster modify a current state of the container-based cluster to match the intended state of the cluster (e.g., initially specified by the user). Modifying the current state to match the intended state involves deploying applications and the infrastructure (e.g., nodes, pods, containers) need to run those applications in the cluster.

Workflow 400 proceeds, at operation 406, with deploying a load generator configured to generate simulated load(s) for containerized application(s) running in the container-based cluster. Because the load generator has not previously been deployed, operation 406 occurs at this point. However, as described below, when returning back to operation 406, the load generator may not need to be re-deployed. The load generator may be deployed and configured to run on any node (e.g., such as any VM), pod, and/or container in the container-based cluster.

Workflow 400 proceeds, at operation 408, with the load generator generating the simulated load(s) for the containerized applications. Different loads and/or the same loads may be applied to different applications running in the cluster.

At operation 410, a virtualization management platform configured to manage components of the container-based cluster, determines performance metrics for the containerized application(s) deployed and running in the container-based cluster. Further, at operations 412, the virtualization management platform additionally collects resource utilization metrics for the container-based cluster.

Workflow 400 then proceeds, at operation 414, with creating a training data instance comprising: a training input comprising the configuration information and the information about the simulated loads and a training output comprising the performance metrics and the resource utilization metrics.

Workflow 400 proceeds, at operation 416, with determining whether all desired loads have been simulated for these particular cluster configuration settings (e.g., provided at operation 402). If all desired loads have not been simulated, then workflow 400 returns to operation 408 to generate new simulated loads for the containerized application(s), and perform operations 410-414 to create another training data instance. Alternatively, if all desired loads have been simulated, then workflow 400 proceeds to operation 418, to determine whether all desired configurations have been deployed and tested (e.g., against different simulated loads) for the container-based cluster. If all desired configurations have not been deployed and tested, then workflow 400 returns to operation 402 to adjust configuration settings for the cluster, and perform operations 404-416 to create additional training data instances for the new configuration settings. Alternatively, if all desired configurations have been deployed and tested, then workflow 400 is complete. The training data instances generated according to workflow 400 are then used to train model(s) to generate candidate configurations for various container-based clusters.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these **necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for determining a target configuration for a container-based cluster, the method comprising:

training a model on a plurality of training data instances to generate the plurality of candidate configurations, wherein each of the plurality of training data instances comprises:

a training input comprising information about configuration settings applied to the container-based cluster and information about one or more loads generated for the container-based cluster; and a training output comprising at least one of performance metrics or resource utilization metrics gathered for the container-based cluster when the corresponding configuration settings are applied and the corresponding one or more loads are generated;

determining, by a virtualization management platform configured to manage components of the container-based cluster, a current state of the container-based cluster;

determining, by the virtualization management platform, at least one of performance metrics or resource utilization metrics for the container-based cluster based on the current state of the container-based cluster;

processing, with the model, the current state and at least one of the performance metrics or the resource utilization metrics and thereby generate the plurality of candidate configurations;

calculating a reward score for each of the plurality of candidate configurations;

selecting a target configuration from the plurality of candidate configurations based on the reward score of the target configuration; and adjusting configuration settings for the container-based cluster based on the target configuration to alter the current state of the container-based cluster.

2. The method of claim 1, wherein selecting the target configuration comprises selecting the target configuration from the plurality of candidate configurations having the highest reward score among the reward scores calculated for the plurality of candidate configurations.

3. The method of claim 1, wherein adjusting the configuration settings for the container-based cluster comprises automatically adjusting at least one of:

a number of pods deployed in the container-based cluster, resource limits for one or more of the pods deployed in the container-based cluster, resource requests for one or more of the pods deployed in the container-based cluster, or a number of nodes deployed in the container-based cluster.

4. The method of claim 1, further comprising:

updating, by one or more controllers on a control plane node of the container-based cluster and based at least in part on the adjusted configuration settings, one or more of infrastructure of the container-based cluster or workloads on one or more worker nodes in the container-based cluster.

5. The method of claim 1, wherein:

the virtualization management platform determines the performance metrics for the container-based cluster; and the performance metrics comprise at least one of:

central processing unit (CPU) usage of each application deployed in the container-based cluster, memory usage of each application, application availability, latency, average response time, input/output (I/O) rate, or request error rates.

6. The method of claim 1, wherein:

the virtualization management platform determines the resource utilization metrics for the container-based cluster; and the resource utilization metrics comprise at least one of:

an average utilization percentage of CPU allocated to one or more of the components of the container-based cluster, or an average utilization percentage of memory allocated to one or more of the components of the container-based cluster.

7. The method of claim 1, wherein:

the container-based cluster comprises one or more worker nodes and one or more control plane nodes;

each of the worker nodes hosts one or more pods, each of the one or more pods comprising one or more containers; and each of the worker nodes and control plane nodes is a physical machine or a virtual machine (VM) configured to run on a physical machine.

8. The method of claim 1, further comprising generating each of the plurality of training data instances, wherein generating a training data instance of the plurality of training data instances comprises:

applying the configuration settings associated with the training data instance to the container-based cluster;

generating, by a load generator, the one or more loads associated with the training data instance; and determining, by the virtualization management platform, at least one of the performance metrics or the resource utilization metrics associated with the training data instance.

9. The method of claim 1, further comprising:

receiving an optimization objective, wherein calculating the reward score for each of the plurality of candidate configurations is based on the optimization objective.

10. A system comprising:

one or more processors; and at least one memory, the one or more processors and the at least one memory configured to:

train a model on a plurality of training data instances to generate the plurality of candidate configurations, wherein each of the plurality of training data instances comprises:

a training input comprising information about configuration settings applied to the container-based cluster and information about one or more loads generated for the container-based cluster; and a training output comprising at least one of performance metrics or resource utilization metrics gathered for the container-based cluster when the corresponding configuration settings are applied and the corresponding one or more loads are generated;

determine, by a virtualization management platform configured to manage components of a container-based cluster, a current state of the container-based cluster;

determine, by the virtualization management platform, at least one of performance metrics or resource utilization metrics for the container-based cluster based on the current state of the container-based cluster;

process, with the model, the current state and at least one of the performance metrics or the resource utilization metrics and thereby generate the plurality of candidate configurations;

calculate a reward score for each of the plurality of candidate configurations;

select a target configuration from the plurality of candidate configurations based on the reward score of the target configuration; and adjust configuration settings for the container-based cluster based on the target configuration to alter the current state of the container-based cluster.

11. The system of claim 10, wherein selecting the target configuration comprises selecting the target configuration having the highest reward score among the reward scores calculated for the plurality of candidate configurations.

12. The system of claim 10, wherein adjusting the configuration settings for the container-based cluster comprises automatically adjusting at least one of:

a number of pods deployed in the container-based cluster, resource limits for one or more of the pods deployed in the container-based cluster, resource requests for one or more of the pods deployed in the container-based cluster, or a number of nodes deployed in the container-based cluster.

13. The system of claim 10, wherein the one or more processors and the at least one memory are further configured to:

update by one or more controllers on a control plane node of the container-based cluster and based at least in part on the adjusted configuration settings, one or more of infrastructure of the container-based cluster or workloads on one or more worker nodes in the container-based cluster.

14. The system of claim 10, wherein:

the virtualization management platform determines the performance metrics for the container-based cluster; and the performance metrics comprise at least one of:

central processing unit (CPU) usage of each application deployed in the container-based cluster, memory usage of each application, application availability, latency, average response time, input/output (I/O) rate, or request error rates.

15. The system of claim 10, wherein:

the virtualization management platform determines the resource utilization metrics for the container-based cluster; and the resource utilization metrics comprise at least one of:

an average utilization percentage of CPU allocated to one or more of the components of the container-based cluster, or an average utilization percentage of memory allocated to one or more of the components of the container-based cluster.

16. The system of claim 10, wherein:

the container-based cluster comprises one or more worker nodes and one or more control plane nodes;

each of the worker nodes hosts one or more pods, each of the one or more pods comprising one or more containers; and each of the worker nodes and control plane nodes is a physical machine or a virtual machine (VM) configured to run on a physical machine.

17. The system of claim 10, wherein the one or more processors and the at least one memory are further configured to generate each of the plurality of training data instances, wherein to generate a training data instance of the plurality of training data instances comprises to:

apply the configuration settings associated with the training data instance to the container-based cluster;

generate, by a load generator, the one or more loads associated with the training data instance; and determine, by the virtualization management platform, at least one of the performance metrics or the resource utilization metrics associated with the training data instance.

18. The system of claim 10, wherein the one or more processors and the at least one memory are further configured to:

receive an optimization objective, wherein calculating the reward score for each of the plurality of candidate configurations is based on the optimization objective.

19. A non-transitory computer-readable medium comprising instructions that, when executed by one or more processors of a computing system, cause the computing system to perform operations for determining a target configuration for a container-based cluster, the operations comprising:

training a model on a plurality of training data instances to generate the plurality of candidate configurations, wherein each of the plurality of training data instances comprises:

a training input comprising information about configuration settings applied to the container-based cluster and information about one or more loads generated for the container-based cluster; and a training output comprising at least one of performance metrics or resource utilization metrics gathered for the container-based cluster when the corresponding configuration settings are applied and the corresponding one or more loads are generated;

determining, by a virtualization management platform configured to manage components of the container-based cluster, a current state of the container-based cluster;

determining, by the virtualization management platform, at least one of performance metrics or resource utilization metrics for the container-based cluster based on the current state of the container-based cluster;

processing, the model, the current state and at least one of the performance metrics or the resource utilization metrics and thereby generate the plurality of candidate configurations;

calculating a reward score for each of the plurality of candidate configurations;

selecting a target configuration from the plurality of candidate configurations based on the reward score of the target configuration; and adjusting configuration settings for the container-based cluster based on the target configuration to alter the current state of the container-based cluster.

20. The non-transitory computer-readable medium of claim 19, wherein selecting the target configuration comprises selecting the target configuration from the plurality of candidate configurations having the highest reward score among the reward scores calculated for the plurality of candidate configurations.

* * * * *